Figure 1:
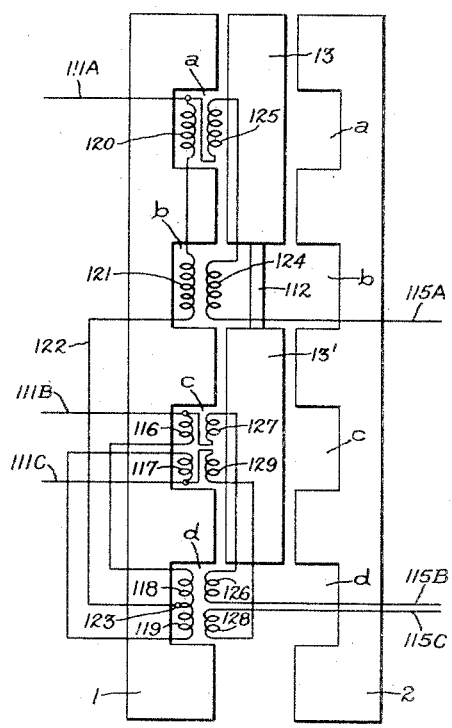

Feb. 4, 1941.         J. B. HANSELL         2,230,946
ALTERNATING CURRENT VOLTAGE REGULATOR
Original Filed Nov. 4, 1938

Inventor:
John B. Hansell,
by Harry E. Dunham
His Attorney.

Patented Feb. 4, 1941

2,230,946

UNITED STATES PATENT OFFICE 2,230,946

ALTERNATING CURRENT VOLTAGE REGULATOR

John Bentley Hansell, Pendleton, England, assignor to General Electric Company, a corporation of New York Original application November 4, 1938, Serial No. 238,925. Divided and this application July 18, 1939, Serial No. 285,126. In Great Britain November 17, 1937

3 Claims. (Cl. 171—119)

This invention relates to alternating current voltage regulators and more particularly to a T-connected three-phase arrangement of two of the regulators forming the subject matter of my original application Serial No. 238,925, filed November 4, 1938, and assigned to the assignee of the present application.

This is a division of my above-identified original application. In that application there is disclosed a moving core type variable voltage transformer regulator in which a pair of windings are serially connected across an input or supply circuit. These windings have separate magnetic circuits, the reluctances of which are oppositely varied by a common movable magnetic core member. Secondary windings are closely electromagnetically coupled with one or both of the primary windings and are connected to energize a separate output circuit or to boost or buck the voltage of the input circuit. The changes in the relative reluctance of the magnetic circuits of the primary windings cause variations in voltage induced in the secondary windings by reason of the varied division of input circuit voltage between the two primary windings. In this way a relatively wide range of voltage adjustment is secured.

Any number of these regulators may be interconnected to a system of like number of phases so as to secure the adjustment or regulation of the voltage of any polyphase circuit. As is also disclosed in the above-identified original application, the individual regulators may be operated simultaneously by suitable means or they may be combined into a unitary structure and the windings may be connected in mesh or in star.

In accordance with the present invention a novel and simplified arrangement is provided whereby but two of the above-described single-phase type regulator units may be connected in equivalent T-formation so as to regulate the voltage of a three-phase circuit in an economical manner.

An object of the invention is to provide a new and improved polyphase voltage regulator.

Another object of the invention is to provide a novel and simple arrangement of what consists essentially of two single-phase regulators of the basic type disclosed in my above-identified original application interconnected in equivalent T-formation so as to regulate the voltage of a three-phase circuit.

The invention will be better understood from the following description taken in connection with the accompanying drawing and its scope will be pointed out in the appended claims.

Figure 2:
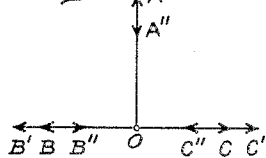
Figure 4:
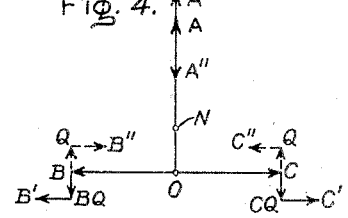
Figure 3:
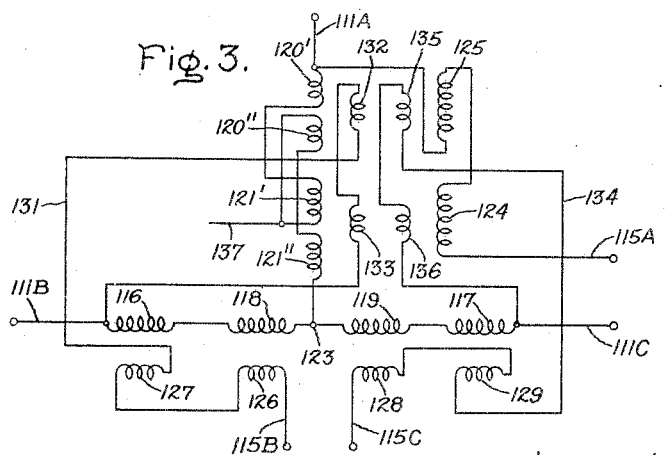

In the drawing, in which certain of the reference characters correspond to those designating similar elements in my above-identified original application, Fig. 1 is a diagrammatic illustration of a simple equivalent T-connection, Fig. 2 is a vector diagram for illustrating the operation of Fig. 1, Fig. 3 is a modification which automatically maintains the same neutral point for the voltage triangles of both the input and output circuits of the regulator, and Fig. 4 is a vector diagram for illustrating the operation of Fig. 3.

Referring now to the drawing, and more particularly to Fig. 1, there is shown therein a magnetic core structure consisting of members 1 and 2 having slots $a$, $b$, $c$ and $d$. Movably mounted between the members 1 and 2 are movable core members 13 and 13' which are mechanically interconnected at 112 so as to operate together as a unit. An input circuit 111A, 111B, 111C is connected to a plurality of primary windings 116, 117, 118, 119, 120 and 121 and a three-phase output circuit 115A, 115B and 115C is connected to the input circuit through a plurality of secondary windings 124, 125, 126, 127, 128 and 129.

The two bottom slots $c$ and $d$ of the fixed cores 1 and 2 accommodate between them four sections of one primary winding, namely the sections 116 to 119, inclusive, which sections are connected in series with one another across the input conductors 111B and 111C in the manner shown. The two upper slots $a$ and $b$ of the fixed cores each accommodate a single winding, 120 and 121 respectively, which are connected in series with one another between the input conductor 111A and through a conductor 122, to the junction 123 between the coils 118 and 119, which junction is the mid-point of the winding comprising the coils 116 to 119 inclusive. The output lead 115A is connected with the conductor 111A through two secondary coils 124 and 125 in series with one another, the coils 124 and 125 being disposed in the same slots $b$ and $a$ as the primary coils 121 and 120 respectively. The coils 124 and 125 are connected in such directions as to produce voltages opposing and assisting respectively the voltage between the conductor 111A and the junction point 123. The lead 115B is connected with the conductor 111B through two secondary coils 126 and 127 in series with one another, said coils being disposed in the same slots $d$ and $c$ as the primary coils 118 and 116 respectively. The lead 115C is connected with the conductor 111C through two secondary coils 128 and 129 in series with one another, the coils 128 and 129 being also disposed in the slots $d$ and $c$, respectively. The coils 126 and 128 are connected in such direction as to produce voltages opposing the voltage between the conductors 111B and 111C, whilst the coils 127 and 129 are connected in such directions as to assist said voltage between the conductors 111B and 111C.

The operation of the arrangement of Fig. 1 will be clear from the vector diagram of Fig. 2, in which the vector OA represents the voltage between the junction point 123 and the conductor 111A, the vectors OB and OC represent respectively the voltage from said junction point to the conductor 111B and to the conductor 111C. To these voltages are added algebraically the resultant voltages of the coils 124 and 125; 126 and 127; and 128 and 129, as indicated by the vectors AA′, BB′, and CC′ respectively when the voltage of the leads 115A, 115B and 115C is increased with respect to the input voltages at the conductors 111A, 111B and 111C, and by the vectors AA″, BB″ and CC″ when the voltage of said leads is reduced with respect to said input voltages.

With the arrangements of connections shown in Fig. 1, the neutral or center point of the voltage triangle on the output leads 115A, 115B and 115C does not correspond with that of the voltage triangle on the input conductors 111A, 111B and 111C, except when the input and output voltages are equal, and in some cases this may be considered a disadvantage. Fig. 3 illustrates an arrangement of windings which may be employed when it is desired that the center of the voltage triangles of the input and output circuits shall always coincide. In Fig. 3 the various coils are illustrated with their axes parallel with the respective vectors in the vector diagram of Fig. 4. The fixed and moving cores of this embodiment of the invention are similar to that of Fig. 1, the fixed cores again having four slots $a, b, c, d$ (Fig. 1) in which the various coils are disposed. The slots $c$ and $d$ again accommodate primary coils 116, 117, 118 and 119 as in Fig. 1, with corresponding secondary coils 126, 127, 128 and 129 for increasing the voltage between the leads 115B and 115C with respect to that between the conductors 111B and 111C. The ends of the coils 127 and 129 remote from said leads 115B and 115C respectively, are, however, instead of being connected directly with said conductor 111B and 111C respectively, connected with the latter through secondary coils disposed in the slots $a$ and $b$ so as to introduce voltages in quadrature with the voltages in the coils 126 to 129 inclusive. Thus, coil 127 is connected with input conductor 111B through conductor 131 and secondary coils 132 and 133 respectively disposed in the slots $a$ and $b$ (Fig. 1), said coils 132 and 133 producing voltages in opposition to one another. In similar manner, the coil 129 is connected with conductor 111C through a conductor 134 and secondary coils 135 and 136 also disposed respectively in the slots $a$ and $b$ (Fig. 1), said coils 135 and 136 producing voltages in opposition to one another. The lead 115A is again connected through the two secondary coils 124 and 125 arranged as in Fig. 1, being located in the slots $b$ and $a$ respectively.

The primary winding in the slots $a$ and $b$ may comprise two coils as in Fig. 1, but the arrangement shown in Fig. 3 includes a further feature in which for providing a neutral point connection, namely at 137 in Fig. 3, the coils 120 and 121 of Fig. 1 are each divided into two sections 120′ and 120″ on the one hand and 121′ and 121″ on the other hand. The circuit proceeds from conductor 111A through the two coils 120′ and 121′ to the connection 137 and thence through the two coils 120″ and 121″ to the junction point 123. By this means the voltage between the conductor 137 and the junction point 123 will always be maintained at a predetermined proportion of the voltage between the conductor 111A and said junction point, this proportion being determined by the relative number of turns of the coils 120′ and 121′ on the one hand and the coils 120″ and 121″ on the other hand. Consequently, by arranging the coils 120″ and 121″ each with half as many turns as each of the coils 120′ and 121′ the conductor 137 provides a neutral point as will be clear from the vector diagram of Fig. 4, in which the same nomenclature is employed as in Fig. 2, and the potential of the conductor 137 is shown at N, the vector ON being one-third the length of OA. For increasing the output voltages with respect to the input voltages the coils 132 and 136 produce voltages as represented by the vectors B—BQ and C—CQ respectively, which are in quadrature with the vectors OB and OC and are of opposite sense to the vector OA, and these voltages together with the voltages produced by the coils 127 and 129, represented by the vectors BQ—B′ and CQ—C′ cause resultant voltages in the leads 115A, 115B and 115C as represented by A′, B′, C′, the neutral of which coincides with that of the triangle ABC. For decreasing the voltage of the leads 115A, 115B and 115C with respect to the conductors 111A, 111B and 111C, the coils 132 and 133 produce voltages as represented by the vectors BQ and CQ respectively, and together with the voltages produced by the coils 126 and 128 (vectors QB″ and QC″) cause resultant voltages of the leads 115A, 115B and 115C as represented by the triangle A″, B″, C″, the neutral of which is again coincident with that of the triangle ABC.

Although the several arrangements of windings above described are shown as arranged as unitary regulators with two slots for each phase, it will be appreciated that more than two slots might be provided for each phase, for example, four slots per phase or said winding arrangements might be applied to two separate regulators with their moving cores coupled together. Single phase embodiments of these modifications are described in my above-identified parent application.

It will also be understood that the various winding arrangements hereinbefore indicated in the foregoing description, although illustrated diagrammatically as being employed in regulators with the same general arrangement of cores as in the embodiment shown in my above-identified parent application, may be employed with any other equivalent arrangement of magnetic circuit structure and relatively movable core or cores falling within the scope of the appended claims.

What I claim as new and desire to secure by Letters Patent of the United States is:

1. An alternating current voltage regulator for a three-phase circuit comprising a winding having a mid-tap, a first pair of windings having a common magnetic circuit connected respectively to the terminals of said mid-tapped winding, said pair of windings and said mid-tapped winding being serially connected between two of the phase conductors of said three-phase circuit, means for oppositely varying the reluctance of the magnetic circuits of said mid-tapped winding and of said first pair of windings, a second pair of windings connected in series between the remaining phase conductor of said three-phase circuit and said mid-tap, means operative simultaneously with the first-mentioned means for oppositely varying the reluctance of the magnetic circuits of the windings constituting said second pair of windings, and a group of additional windings closely electromagnetically coupled respectively to at least two of the windings which are connected in circuit respectively between said mid-point and at least two of the phase conductors of said three-phase circuit and connected in series with said two phase conductors for symmetrically varying the voltage of said three-phase circuit.

2. An alternating current voltage regulator for a three-phase circuit comprising a winding having a mid-tap, a first pair of windings having a common magnetic circuit connected respectively to the terminals of said mid-tapped winding, said pair of windings and said mid-tapped winding being serially connected between two of the phase conductors of said three-phase circuit, means for oppositely varying the reluctance of the magnetic circuits of said mid-tapped winding and of said first pair of windings, a second pair of windings connected in series between the remaining phase conductor of said three-phase circuit and said mid-tap, means operative simultaneously with the first-mentioned means for oppositely varying the reluctance of the magnetic circuits of the windings constituting said second pair of windings, a group of three windings closely electromagnetically coupled respectively to a winding of said second pair and to a winding on each side of said mid-tap and connected in series with said phase conductors for symmetrically varying the voltage of said three-phase circuit, and at least two additional windings closely inductively coupled to at least one of said second pair of windings and connected in series respectively with the two of said group of three windings which are closely inductively coupled to the windings on opposite sides of said mid-tap for producing quadrature voltages with respect to the voltages of their serially connected windings which are of such value as to prevent a difference between the neutral of the three-phase input and output voltages of said regulator.

3. An alternating current voltage regulator for a three-phase circuit comprising a winding having a mid-tap, a first pair of windings having a common magnetic circuit connected respectively to the terminals of said mid-tapped winding, said pair of windings and said mid-tapped winding being serially connected between two of the phase conductors of said three-phase circuit, means for oppositely varying the reluctance of the magnetic circuits of said mid-tapped winding and of said first pair of windings, a second pair of windings connected in series between the remaining phase conductor of said three-phase circuit and said mid-tap, means operative simultaneously with the first-mentioned means for oppositely varying the reluctance of the magnetic circuits of the windings constituting said second pair of windings, and a group of three windings closely electromagnetically coupled respectively to a winding of said second pair and to a winding on each side of said mid-tap and connected respectively in series with said phase conductors for symmetrically varying the voltage of said three-phase circuit.

JOHN BENTLEY HANSELL.